(12) United States Patent
Waltner et al.

(10) Patent No.: US 10,131,442 B2
(45) Date of Patent: Nov. 20, 2018

(54) POWER LEVELING CONTROLLER

(71) Applicant: Sikorsky Aircraft Corporation, Stratford, CT (US)

(72) Inventors: Peter James Waltner, Royal Palm Beach, FL (US); Joseph Lawrence Simonetti, Southbury, CT (US); Nicholas D. Lappos, Guilford, CT (US); Jonathan Hartman, Lorton, VA (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 15/337,327

(22) Filed: Oct. 28, 2016

(65) Prior Publication Data
US 2017/0297732 A1 Oct. 19, 2017

Related U.S. Application Data

(60) Provisional application No. 62/248,717, filed on Oct. 30, 2015.

(51) Int. Cl.
| | |
|---|---|
| *B64D 31/12* | (2006.01) |
| *B64D 27/10* | (2006.01) |
| *B64D 27/24* | (2006.01) |
| *B64D 27/02* | (2006.01) |
| *B64D 41/00* | (2006.01) |
| *H02J 3/00* | (2006.01) |
| *B64C 27/04* | (2006.01) |
| *B64D 31/06* | (2006.01) |

(52) U.S. Cl.
CPC .............. *B64D 31/12* (2013.01); *B64C 27/04* (2013.01); *B64D 27/10* (2013.01); *B64D 27/24* (2013.01); *B64D 31/06* (2013.01); *B64D 41/00* (2013.01); *H02J 3/00* (2013.01); *B64D 2027/026* (2013.01); *B64D 2221/00* (2013.01); *Y10S 903/93* (2013.01)

(58) Field of Classification Search
CPC .. B64D 2027/026; B64D 27/10; B64D 27/24; B64D 31/12; Y10S 903/93
USPC ........................................................ 701/3, 22
See application file for complete search history.

(56) References Cited

U.S. PATENT DOCUMENTS

| 8,543,262 B1 | 9/2013 | Gehrke et al. |
| 8,552,575 B2 * | 10/2013 | Teets .................... G08G 1/0129 |
| | | 290/40 C |

(Continued)

FOREIGN PATENT DOCUMENTS

WO 2015034547 A1 3/2015

OTHER PUBLICATIONS

Extended European Search Report dated Mar. 16, 2017; EP Application No. 16196292.3; pp. 1-9.

*Primary Examiner* — Tyler J Lee
(74) *Attorney, Agent, or Firm* — Cantor Colburn LLP

(57) ABSTRACT

The disclosure herein relates to power leveling mechanisms comprising a high frequency controller. The power leveling mechanism receives a power demand signal indicating a power requirement of a vehicle and determines a high frequency component of the power demand signal. The power leveling mechanism also provides a signal to a primary propulsion system and provides, via the high frequency controller, a high bandwidth signal based on the high frequency component to an auxiliary propulsion system.

12 Claims, 12 Drawing Sheets

(56) References Cited

U.S. PATENT DOCUMENTS

| | | | |
|---|---|---|---|
| 8,757,542 B2 | 6/2014 | Hopdjanian et al. | |
| 2008/0111420 A1* | 5/2008 | Anghel | H02J 4/00 307/9.1 |
| 2008/0111421 A1* | 5/2008 | Anghel | H02M 7/81 307/23 |
| 2009/0224096 A1* | 9/2009 | Waide | B64C 29/0033 244/60 |
| 2009/0302153 A1 | 12/2009 | Matasso et al. | |
| 2010/0140418 A1* | 6/2010 | Silkey | B64D 33/02 244/53 B |
| 2011/0071705 A1 | 3/2011 | Matuszeski et al. | |
| 2012/0116612 A1* | 5/2012 | Andrews | B64C 27/72 701/3 |
| 2013/0099064 A1* | 4/2013 | Cherepinsky | B64C 13/04 244/223 |
| 2013/0119185 A1* | 5/2013 | Botti | B64C 27/14 244/17.21 |
| 2013/0147204 A1 | 6/2013 | Botti et al. | |
| 2015/0100181 A1 | 4/2015 | Strauss et al. | |
| 2015/0352962 A1* | 12/2015 | Hokoi | B60L 11/123 290/16 |

\* cited by examiner

POWER LEVELING CONTROLLER

CROSS-REFERENCE TO RELATED APPLICATIONS

This application claims priority to U.S. Provisional Patent Application Ser. No. 62/248,717, filed Oct. 30, 2015, the contents of which are incorporated herein by reference in their entirety.

TECHNICAL FIELD

The subject matter disclosed herein relates generally to variable power demand operating environments, and to supplying primary power and auxiliary power in accordance with monitoring power demand of variable power demand operating environments.

BACKGROUND

A propulsion system of an aircraft converts stored energy into mechanical work to drive one or more rotor systems. Generally, a natural torque of a rotor system over time increases and decreases due to a natural variance or oscillation from a target torque. This variance is usually very small (e.g., half of a percent) in steady flight conditions and is dampened to achieve the target torque (e.g., a steady state torque) and to abide by acceleration and deceleration constraints imposed by the power plant design. However, dampening the variance inherently makes the propulsion system less responsive, such that at critical times during flight the propulsion system cannot provide a power needed to maintain operation of the aircraft in its current mode. In addition to slow power response, changes in power demand can cause lower efficiency related to spool-up and spool-down in varying power required environments (e.g., icing, low level flying, gusts, turbulence).

BRIEF SUMMARY

In accordance with an embodiment, a power leveling mechanism comprises a high frequency controller. The power leveling mechanism receives a power demand signal indicating a power requirement of a vehicle and determines a high frequency component of the power demand signal. The power leveling mechanism also provides a signal to a primary propulsion system and provides, via the high frequency controller, a high bandwidth signal based on the high frequency component to an auxiliary propulsion system. The power leveling mechanism can be employed in a system, method, and/or computer program product.

Other aspects, features, and techniques will become more apparent from the following description taken in conjunction with the drawings.

BRIEF DESCRIPTION OF THE SEVERAL VIEWS OF THE DRAWINGS

The forgoing and other features, and advantages of the disclosure are apparent from the following detailed description taken in conjunction with the accompanying drawings in which like elements are numbered alike.

DETAILED DESCRIPTION

As indicated above, dampening the natural variance inherent to the rotor system torque of the aircraft makes the propulsion system less responsive, such that at critical times during flight the propulsion system cannot provide a power needed to maintain operation at current levels. The disclosure herein provides a power leveling mechanism that causes primary and auxiliary propulsion systems to work in concert to fill in power deficits or extract excess power as needed to maintain operation of any vehicle and increase primary power system efficiency and improve total power delivery response characteristics.

In general, embodiments disclosed herein can include a power leveling system, method, and/or computer program product (herein generally referred to as a power leveling system) that supplies primary power and auxiliary power in accordance with monitoring power demand of variable power demand operating environments. Further, the power leveling system can monitor a power demand of a vehicle to provide long-period power and short-period power from multiple power sources of the vehicle to meet power demands of the vehicle (e.g., an auxiliary power source evens out power of a primary power source).

Figure 1:
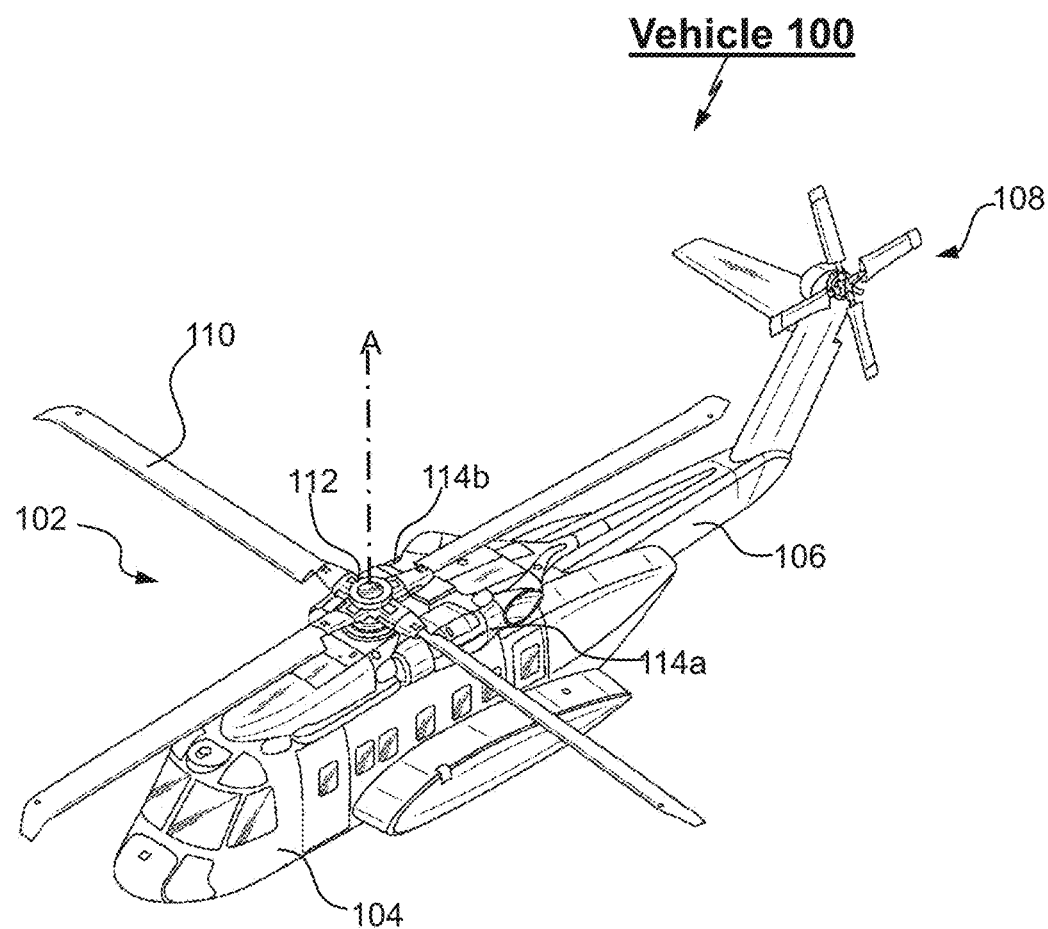
FIG. 1 depicts an exemplary rotary wing aircraft in accordance with an embodiment.

FIG. 1 schematically illustrates a vehicle 100, as a rotary wing aircraft, which includes a power leveling system (shown in FIG. 2) in accordance with an embodiment. Although a particular vehicle configuration is illustrated and described in the disclosed embodiments, other configurations and/or machines with single or multi-engine primary power plants, such as high speed compound rotary wing aircraft with supplemental translational thrust systems, dual contra-rotating, coaxial rotor systems, tilt-rotors and tilt-wing, fixed wing, ground-based power plants or vehicles, and the like will also benefit from embodiments.

As shown in FIG. 1, a vehicle 100 includes an airframe 104 having a rotor system comprising a main rotor assembly 102 and an extending tail 106 which mounts a tail rotor system 108, such as an anti-torque system, a translational thrust system, a pusher propeller, a rotor propulsion system, and the like. The main rotor assembly 102 includes a plurality of rotor blades 110 mounted to a rotor hub 112. The main rotor assembly 102 is driven about an axis of rotation A through a torque conversion, such as a main rotor gearbox, by a multi-engine power plant system, here shown as two engines 114a and 114b. The engines 114a and 114b generate the power available to the vehicle 100 for driving a transmission system that is connected to the main rotor assembly 102 and the tail rotor system 108 as well as for driving various other rotating components to thereby supply power (e.g., electrical, hydraulic, pneumatic) for flight operations. Examples of the engines 114a and 114b can include any internal combustion engine, turbine engine, spark ignition engine, compression ignition engine, etc. Further, the engines 114a and 114b (along with other engines described below) can also include a diesel to electric engine system, a fuel cell system, etc., and thus the engines 114a and 114b should not be construed to any particular engine type.

In embodiments, the vehicle 100 can utilize a plurality of approaches for supplying a power from any engine 114a and 114b of the multi-engine power plant system (e.g., a primary power system and an auxiliary power system) of the vehicle 100. The approaches can be utilized through the power leveling system shown in FIG. 2.

Figure 2:
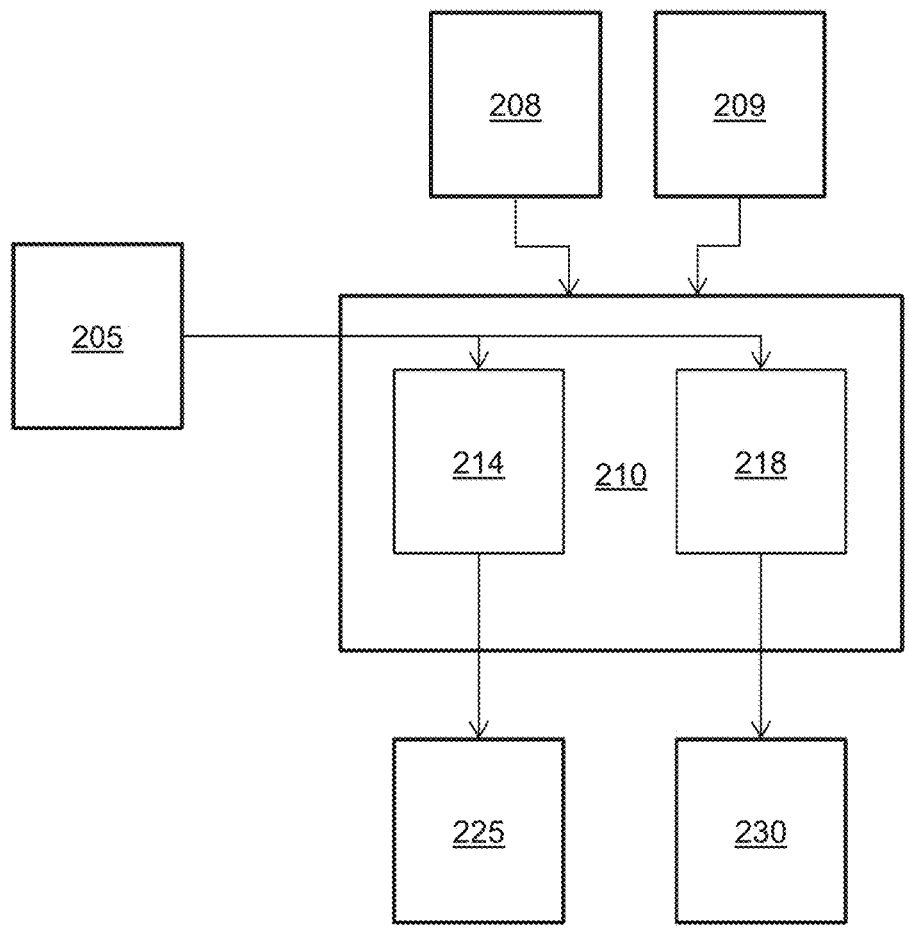
FIG. 2 depicts a power leveling system in accordance with an embodiment.

FIG. 2 depicts a schematic view of a power leveling system 200 that includes a power demand signal 205, mode select signal 208, power plant state signal 209, a power leveling controller 210 comprising a high frequency controller 214 and a low frequency controller 218, a high frequency power system controller 225, and a low frequency power system controller 230. The power leveling system 200 can be an independent control system in aircraft 100, or part of a flight control computer (FCC) of the aircraft 100. In general, the power leveling system 200 receives the power demand signal 205 indicating a power requirement of a vehicle for operation and determines a low frequency component and a high frequency component of the power demand signal. The power leveling system 200 also provides, via the low frequency controller 218, a low bandwidth signal based on the low frequency component to a primary propulsion system and provides, via the high frequency controller 214, a high bandwidth signal based on the high frequency component to an auxiliary propulsion system. The combination of the low bandwidth signal and the high bandwidth signal enable the primary and auxiliary propulsion systems to meet the power requirement of the vehicle.

The power demand signal 205 comprises at least one signal from one or more sensors, components and/or systems onboard the aircraft 100. For example, the power demand signal 205 can be derived from at least one signal including, but are not limited to, collective addition, collective rate, rotor speed, and/or physical torque. The power demand signal 205 is utilized in a closed loop control around a rotor speed and a rotor speed rate with respect to a governor (e.g., of the main rotor assembly 102 and/or the tail rotor system 108). The power leveling system 200, e.g., via the power leveling controller 210, creates the closed loop control that includes monitoring the power demand signal 205, along with processing predictors of the power demand signal 205 (e.g., collective pitch position and/or aircraft state variables), and accordingly commands supply of primary and auxiliary power to the aircraft 100.

The power leveling controller 210 can be a full authority digital engine controller comprising a memory and a processor (or engine control unit) for managing and operating all aspects of the multi-engine power plant system of the vehicle 100. In one embodiment, the power leveling controller 210 utilizes the power demand signal 205 to supply a long-period power from a primary power supply and a short-period power demand from an auxiliary power supply.

The power leveling controller 210 can utilize the high frequency controller 214, which can be a high pass filter, to control the short-period power supply. Further, the high frequency power system controller 225 can be a controller for any secondary, subsequent, supplementary, or high bandwidth power systems (the auxiliary propulsion system or auxiliary power supply). Examples of the auxiliary power supply include, but are not limited to, an electric hybrid drive, small turbine, internal combustion engine, auxiliary power unit, and a managed loss system. Note that the high frequency power system controller 225 is capable of delivering power at a high frequency and such systems that can respond very quickly are typically smaller than other power systems.

The power leveling controller 210 can utilize the low frequency controller 218, which can be a low pass filter, to control the long-period power supply. Note that the power leveling controller 210 can utilize logic that can split power demand signals into parts and can split up power delivery and/or power consumption responsibility by frequency band to various power delivery and power consumption systems. The low frequency power system controller 230 can be a controller for any primary, main, or low bandwidth power systems (the primary propulsion system or primary power supply). An example of the primary power supply includes, but is not limited to, a primary turbine engine.

Figure 7:
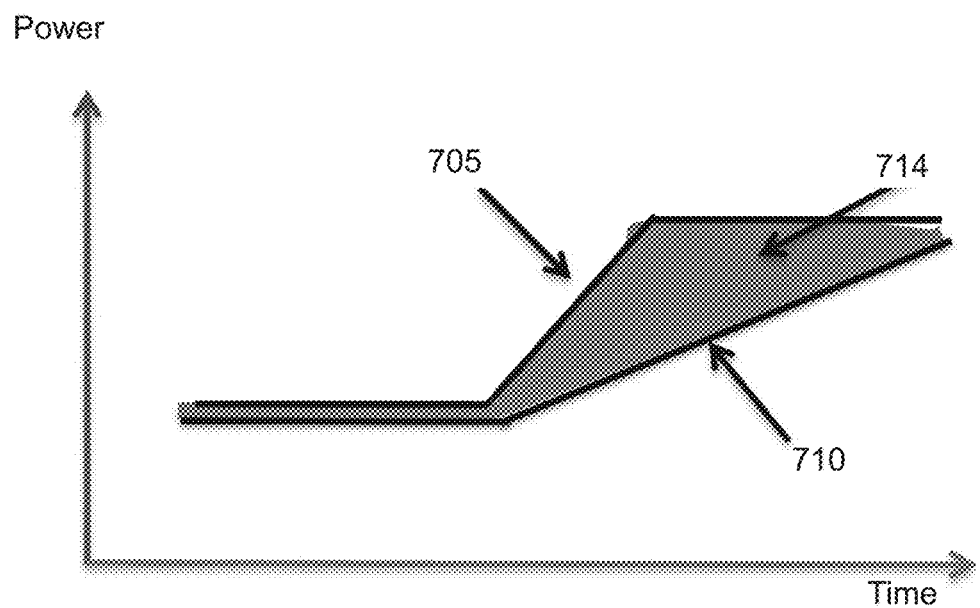
FIG. 7 illustrates a graph of an example use case of a power leveling system regarding power demanding power in accordance with an embodiment.

In an example operational embodiment, the primary power supply is a primary turbine engine of the aircraft 100 with a low frequency response time (e.g., the primary turbine engine, in general, may not have a response beyond one-half hertz due to the nature of a gas-turbine engine dynamics). The auxiliary power supply is an electric power system of the aircraft 100 with a high frequency response time (e.g., greater than one-half hertz, for example, ten hertz or greater due to a nature of the electromagnetic motors which are within the electric power system). Note that the electric power system is well suited for having high bandwidth, where if a power demand exceeds a rate at which the primary turbine engine can accelerate, the electric power system can immediately provide power to the aircraft 100 (in response to the high frequency controller 214 providing a high frequency signal to the high frequency power system controller 225 of the electric power system, for example, as seen in FIG. 7).

The mode select signal 208 can be used to select the operational mode of the power leveling controller 210. For instance, this mode select signal 208 can be used by the power leveling controller 210 to define a frequency threshold that separates "low" and "high" frequencies to determine if a given power demand signal 205 will produce a command signal by the high frequency controller 214 and/or the low frequency controller 218 (note that if the frequency content is at a cross-over frequency, the signal can come through both controllers due to the nature of filtering). This mode select signal 208 can be controlled automatically by an aircraft flight control computer system or can be controlled manually by a pilot.

Additionally, the power plant state signal 209 can be used to provide feedback to the power leveling controller as to the operating ambient conditions, power plant state, power plant capacity, duty cycle, capability or other parameter of a propulsion device such that the power leveling controller 210 can optimize the frequency content and amplitude of the command signals provided by the high and low frequency controllers 214 and 218, respectively. In one embodiment, the power plant state signal 209 could determine a battery capacity in an electric auxiliary propulsion system and could adjust the maximum allowable control amplitude with respect to frequency, such that stored electric energy would not be exhausted prior to reaching a state where the battery can be recharged (as discussed further below). The mode select signal 208 and the power plant state signal 209 can be used singly or in combination to assist the power leveling controller 210 to perform this task.

Thus, the power leveling controller 210 can cause the primary turbine engine and the electric power system to work in concert to fill in power deficits or extract excess power as needed to maintain operation of the aircraft 100, in accordance with the power demand signal 205 (e.g., combination of the low bandwidth signal of the low frequency controller 218 and the high bandwidth signal of the high frequency controller 214 enable the primary and auxiliary propulsion systems to meet the power requirement of a rotor system of the aircraft 100).

Figure 3:
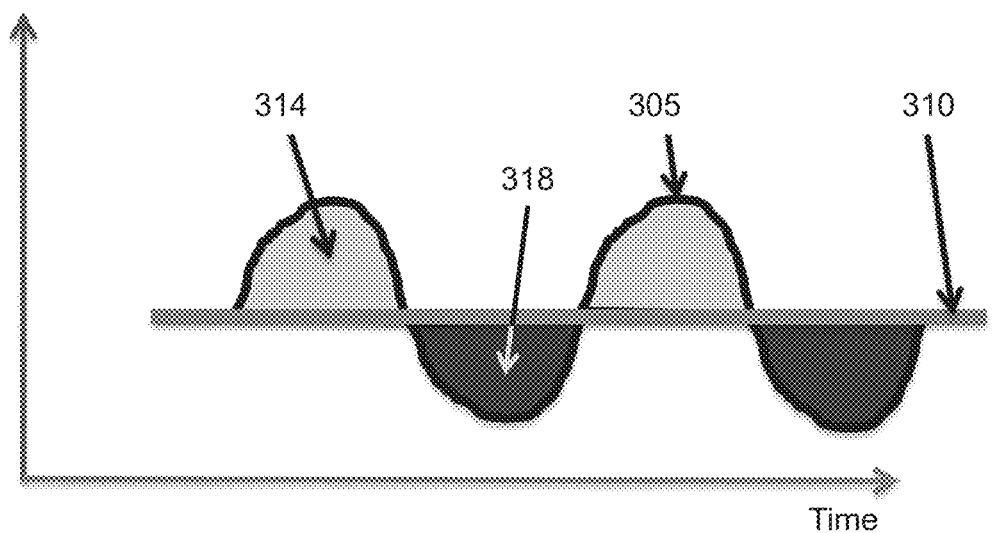
FIG. 3 illustrates an example graph of providing peak shaving by a power leveling system in accordance with an embodiment.
Figure 4:
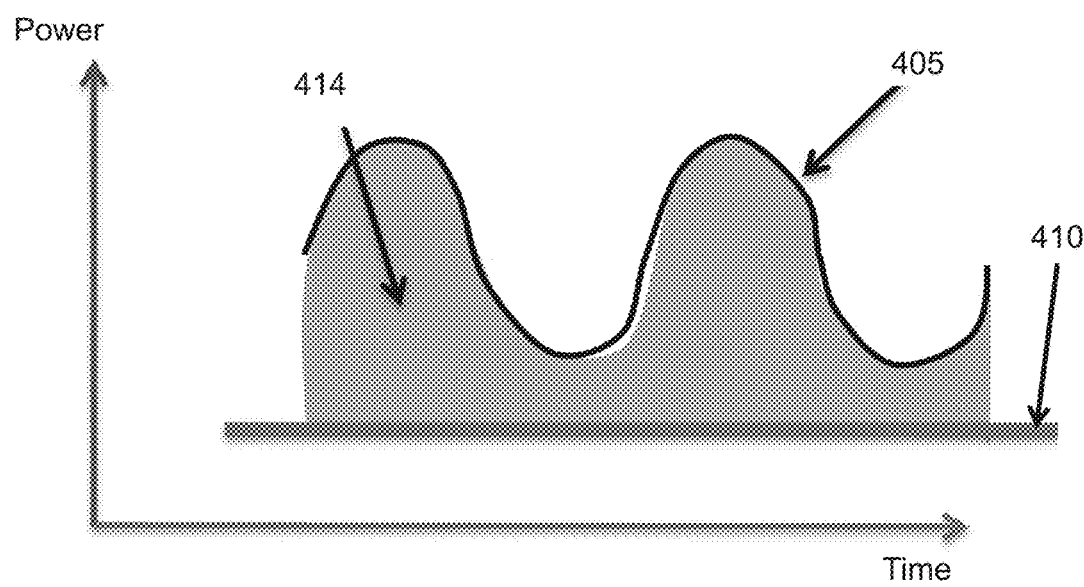
FIG. 4 illustrates an example graph of providing base power and variable power by a power leveling system in accordance with an embodiment.
Figure 5:
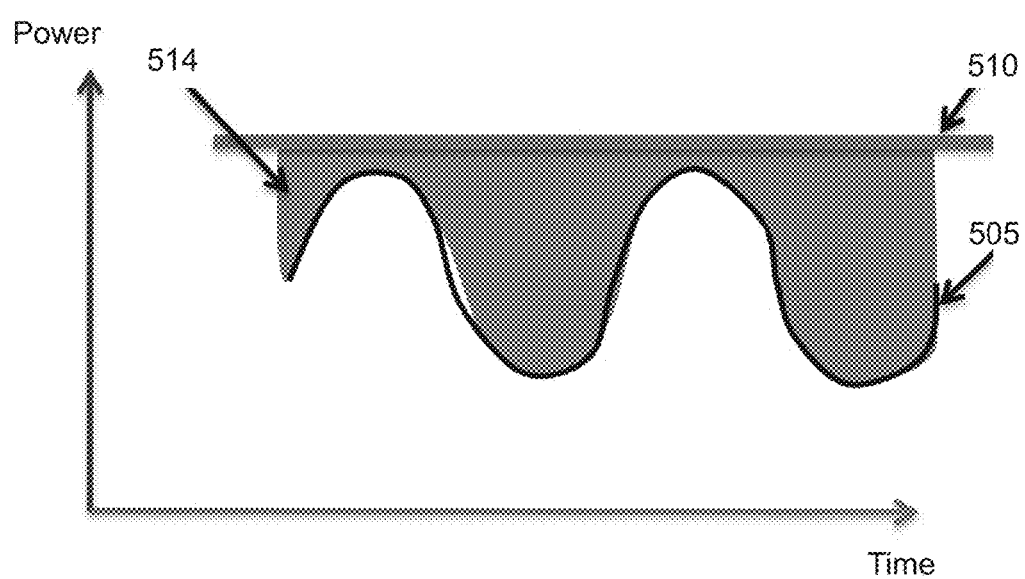
FIG. 5 illustrates an example graph of absorbing excess power by a power leveling system in accordance with an embodiment.

Turning now to FIGS. 3-5, example graphs 300, 400, and 500 illustrate plots of power (y axis) vs. time (x axis). FIG. 3 is an example of providing a peak shaving by the power leveling system 200 in accordance with an embodiment. As shown, the example graph 300 of FIG. 3 illustrates that the rotor system of the aircraft requires a power 305 to provide operation. Further, the primary turbine system, controlled by signals from the low frequency controller 218 to low frequency power system controller 230, delivers a steady state power 310 to the rotor system. Because, at times, there is a deficiency between the required power 305 and the steady state power 310, the electric power system of the aircraft 100 can provide, based on control signals from the high frequency controller 214 to high frequency power system controller 225, peak shaving to provide a temporarily power boost (e.g., area 314) above the steady state power 310. In this way, the electric power system fills in the high frequency power demands above the steady state power 310. Note that the electric power system can be recharged by the power leveling system 200 by commanding the high frequency power system controller 225 to command consumption of extra power (area 318) provided by the primary turbine system. For rotorcraft, providing temporary power boosts (area 314) reduces the tendency for rotor droop (i.e. loss of rotor speed), while consuming the excess power delivered (area 318) reduces the tendency for rotor over speed in variable power required environments. In this manner, the turbine engine can be allowed to operate at a relatively constant steady state power 310 level in an operating envelope which has varying required power 305 by using the electric power system to alternately provide power boosts (area 314) and consume extra power (area 318) as required.

FIG. 4 is an example of providing a base power and a variable power by the power leveling system 200 in accordance with an embodiment. As shown, the example graph 400 of FIG. 4 illustrates that the rotor system of the aircraft requires a power 405 to provide operation. Further, the primary turbine system, controlled by signals from the low frequency controller 218 to low frequency power system controller 230, delivers a steady state power 410 as the base power to the rotor system set to a value less than the minimum value of power 405. Because there is a deficiency between the required power 405 and the steady state power 410, the auxiliary power system (e.g. a "small" power plant, APU+ hybrid electric, fuel cell, or other auxiliary power system) of the aircraft 100 can provide, based on control signals from the high frequency controller 214 to high frequency power system controller 225, continuous, variable power to meet demand (e.g., area 414) to meet the required power 405. Note that the low frequency controller can be configured to set the steady state power 410 such that the required power 405 will not fall below the steady state power 410 to prevent over speeding the rotor; alternately, a power consuming system is used to absorb the excess power as shown in FIG. 5. Also, note that steady state component of the continuous, variable power can also be maintained at a high level to prevent the aircraft from an immediate spool down of the engine in case it is anticipated that less power will be needed momentarily.

FIG. 5 is an example of absorbing excess power by the power leveling system 200 in accordance with an embodiment. As shown, the example graph 500 of FIG. 5 illustrates that the rotor system of the aircraft requires a power 505 to provide operation. Further, the primary turbine system, controlled by signals from the low frequency controller 218 to low frequency power system controller 230, delivers a steady state power 510 to the rotor system. The steady state power 510 exceeds the power required 505 by the rotor system. Because there is excess power between the required power 505 and the steady state power 510, the electric power system of the aircraft 100 can absorb, based on control signals from the high frequency controller 214 to high frequency power system controller 225, the excess power (e.g., area 514) and recharge onboard energy storage devices. In this way, for example, since the low frequency system is oversized, the high frequency system can be a power sink (battery) to absorb excess power, which can be used in other parts of aircraft 100. Alternately or additionally, devices can be configured to specifically waste energy to drive required power 505 up and reduce the amplitude and frequency of fluctuations to a level that the low frequency power plant can provide a nearly steady state power or steady state power 510. While not limited to these examples, onboard electrically or mechanically driven compressors and hydraulic systems can be configured to waste pneumatic or hydraulic fluid energy to attain these results. Other electrical and non-electric power loss systems are also contemplated. For example, a tradeoff is contemplated where an embodiment is wasting energy for the gain of effective engine response time. Such a system may be beneficial if there is no desire to add systems and/or complexity to allow operations described by FIGS. 3-5.

For brevity and clarity, steady state power 310, 410, and 510 of FIGS. 3-5 are described as a "steady state power" (a.k.a. moving average power); however, these steady state powers 310, 410, and 510 may fluctuate with respect to time as the operating regime and may be more reflective of a "moving average" of the power demand than a strictly constant value. "Steady state" is intended to be "steady state" with respect to the underlying low frequency fluctuations of power and thus may be quasi-steady state. FIGS. 6-12 use references to "quasi-steady state powers" to reflect the low frequency power demand with respect to the operating environment and operation mode of power leveling system 200.

Figure 6:
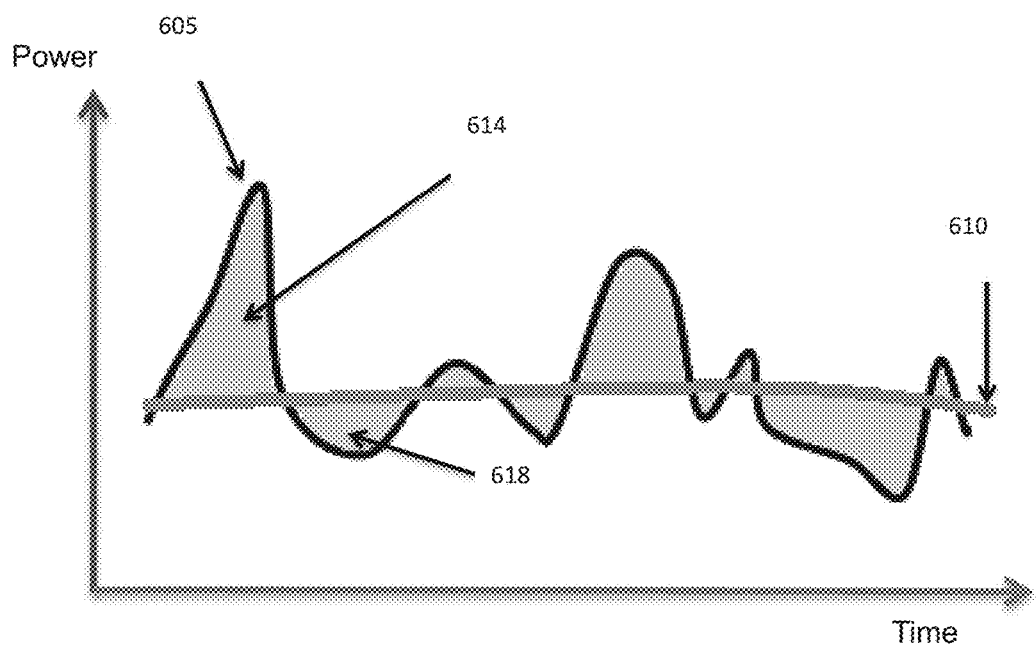
FIG. 6 illustrates a graph of an example use case of a power leveling system regarding turbulence in accordance with an embodiment.

Turning now to FIGS. 6-12, example graphs 600, 700, 800, 900, 1001, 1101, and 1201 illustrate an example use case plotted according to power (y axis) vs. time (x axis). FIG. 6 is an example of a use case regarding turbulence in accordance with an embodiment. As shown, the example graph 600 of FIG. 6 illustrates that the rotor system of the aircraft requires a power 605 to provide operation during turbulence. Further, the primary turbine system, controlled by signals from the low frequency controller 218 to low frequency power system controller 230, delivers a quasi-steady state power 610 to the rotor system. As the required power 605 spikes based on the turbulence experienced by the aircraft 100, the deficiencies between the steady state power 610 and the power required 605 are filled in by temporarily power boosts (e.g., area 614) of the electric power system of the aircraft 100, based on control signals from the high frequency controller 214 to high frequency power system controller 225. Similarly, the temporary power excess between the quasi-steady state power 610 and the required power 605 may be consumed by temporary power loads (e.g. area 618) applied by the electric power system of aircraft 100, based on control signals from the high frequency controller 214 to high frequency power system controller 225.

FIG. 7 is an example of a use case regarding power demanding power in accordance with an embodiment. As shown, the example graph 700 of FIG. 7 illustrates that the rotor system of the aircraft requires a power 705 to provide operation during maneuvering that requires a fast response. Note that, while the primary turbine system delivers a steady state power 710 to the rotor system, at times, the primary turbine system cannot provide the extra power during these maneuvers in a sufficiently timely manner for the aircraft to be able to perform the intended maneuver within the limitations of the primary turbine design (e.g. providing a quick increase in power while maintaining surge margin, preventing temperature and speed overshoot, and other factors). In turn, the difference is handled by a temporarily power boost (e.g., area 714) of the electric power system of the aircraft 100.

Figure 8:
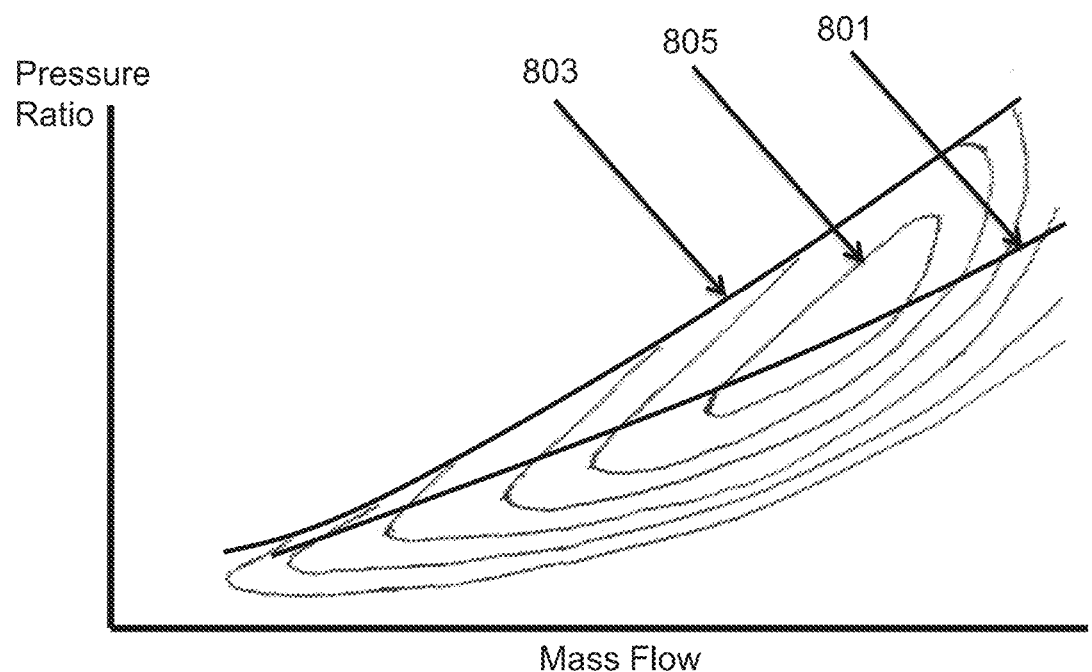
FIG. 8 illustrates a graph of an example compressor map for a turbine engine in accordance with an embodiment.

FIG. 8 is an example compressor map for a turbine engine illustrated via graph 800. One design constraint for a turbine engine is to design a compressor that provides compressed air to the burner and allows for a quick engine response without resulting in engine surge. The compressor operating line 801 is particular for a given engine design and the vertical distance in pressure ratio between the operating line 801 and the surge line 803 may be interpreted as the surge margin. Note that lines 805 are lines of constant compressor efficiency, which can be utilized to observe changes in efficiency by moving the operating line 801 close to the surge line 803. Surge margin is an indicator of how quickly an engine can accelerate without experiencing surge. As it is seen, the surge margin varies with respect to mass flow and which consequently means that the engine's ability to accelerate without encountering surge varies with mass flow. For the example engine whose compressor characteristics are shown in FIG. 8, when the engine is in a high power state (i.e. high mass flow, high pressure ratio), the distance between the operating line 801 and surge line 803 is greater than the distance between the lines at a low power state (i.e. low mass flow, low pressure ratio). As such, this example engine would have slow engine response time when transitioning from a low power state to a high power state. Additionally, to achieve sufficient surge margin between the operating line 801 and the surge line 803 over the entire operating envelope, compromises in engine efficiency and other design characteristics may be required. Therefore, using the power leveling controller 210 to command a high frequency power response with the high frequency controller 214 allows a primary power plant to accelerate slowly (reference FIG. 7), which allows for optimization of the primary power plant, while at the same time allowing total power delivery rate to the rotor system to remain satisfactory.

Figure 9:
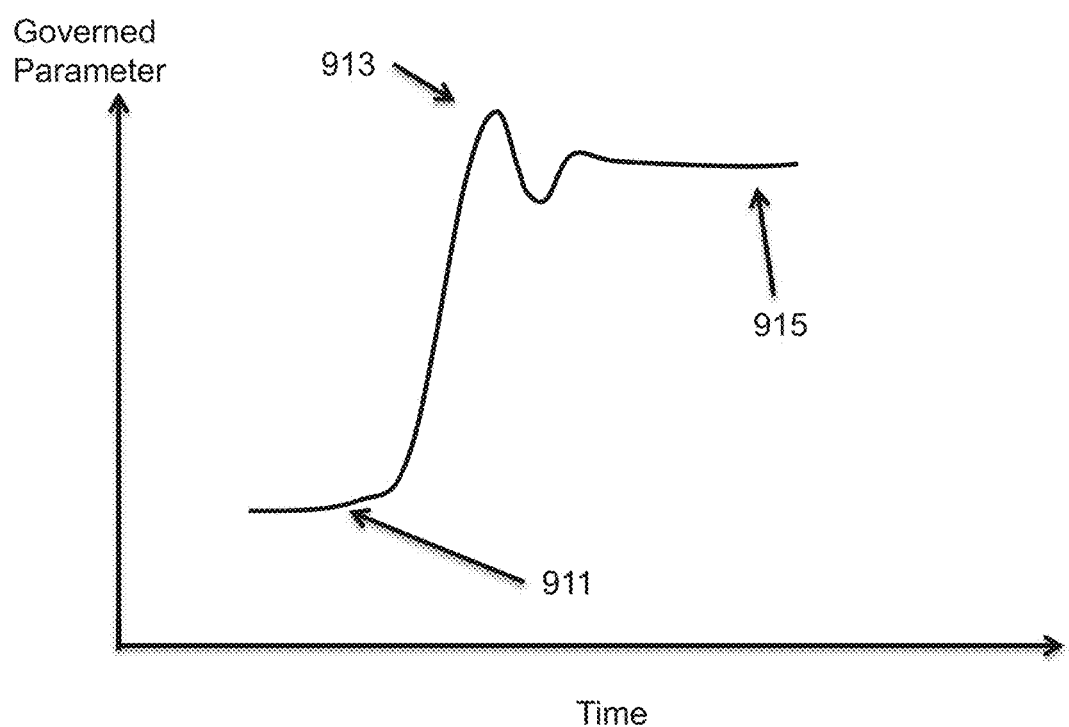
FIG. 9 illustrates a graph of an example governed parameter overshoot during an engine acceleration.

FIG. 9 is an example of a governed parameter overshoot during an engine acceleration illustrated via graph 900. The governed parameter can be engine temperature, engine speed, engine torque, or other relevant state parameter. A typical time-history trace of a governed parameter during a commanded engine acceleration (e.g. see the FIG. 7 use case) starts out at with the governed parameter at an initial state 911, increases to a peak value 913 and then levels out at the desired final value 915. To achieve a quick engine response and rise to final value 915, at times, overshoot to a peak value 913 occurs. When the final desired final value 915 is an engine operating limit, the peak value may result in temporary exceedance of engine limits. Typically, slower accelerations result in smaller overshoots, and thus if the engine is allowed to accelerate slowly, less design margin is required to be reserved to allow for peak value 913 overshoots above the desired final value 915.

Considering FIGS. 7-9, it is seen that with a high frequency power system controller 225 governing a high frequency power plant, the overall power delivery response rate characteristics can be improved and alternately or additionally the engines 114a and 114b may be unburdened with the responsibility of providing a fast power response and thus may be optimized for other design characteristics (e.g. increased efficiency, increased total power, etc.).

Figure 10:
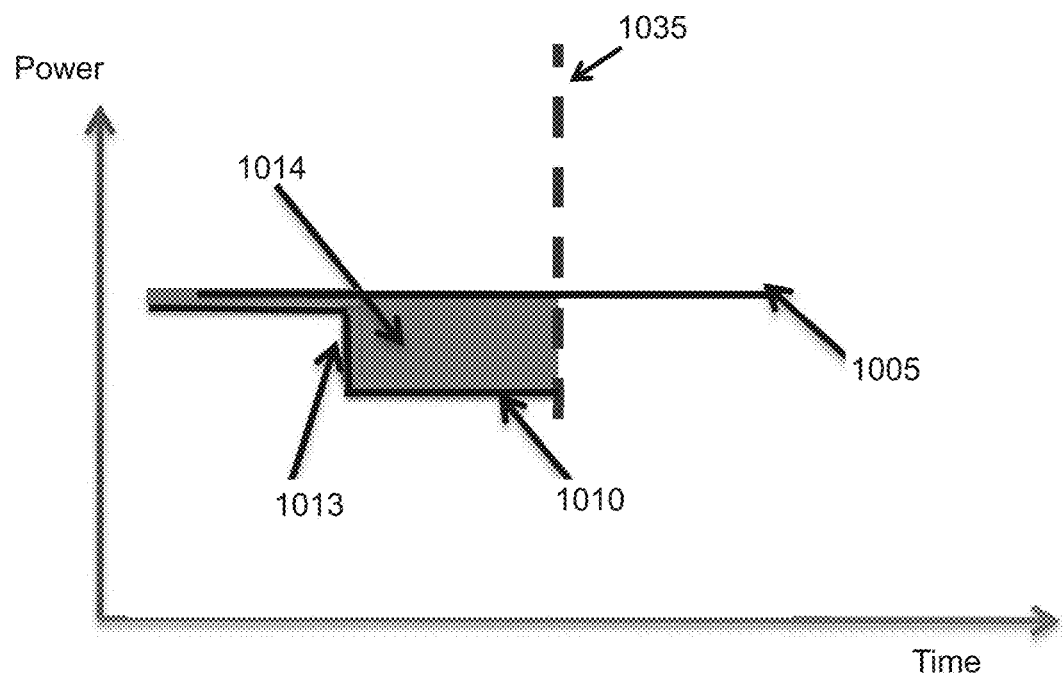
FIG. 10 illustrates a graph of an example use case of a power leveling system regarding a boost operation in accordance with an embodiment.

FIG. 10 is an example of a use case regarding a boost operation in accordance with an embodiment. As shown, an example graph 1001 of FIG. 10 illustrates a power 1005 required by the rotor system of the aircraft and a steady state power 1010 delivered by the primary turbine system. Further, if a primary turbine system fails at point 1013 (e.g., an engine is lost), the power leveling system 100 can engage the electric power system to provide a temporarily power boost (e.g., area 1014) until a critical phase of flight of the aircraft 100 is complete (e.g., at dashed-line 1035 the aircraft 100 maneuvering is over). This critical phase could be a transient rotor speed droop while an alternate primary power source (e.g. a second turbine engine in multi-turbine engine aircraft) is able to spool up and produce the required power as the power demanded by the rotor system to be delivered by the remaining engine(s). Alternately, this critical phase could be the short duration between engine failure point 1013 and the maneuver termination point 1035 which could represent landing safely or achieving a safe flight condition. Additionally, the critical phase could be a transient rotor speed droop after an emergency in which one or more primary engines (e.g. engine 114a and/or engine 114b) fail and a temporary boost in power 1014 is provided in order to prevent excessive rotor speed droop until the pilot has sufficient time to react to the engine failure. Alternately, in an all engines operating case where the pilot demands power at a rate faster than the engines can provide (i.e. maneuvering to avoid other aircraft, terrain, or arresting a high rate of descent prior to landing) the high frequency power system controller 225 can command a fast power increase to prevent an unsafe rotor speed decay. To those skilled in the art, it will be readily apparent that these and other benefits will be available to aircraft implementing a high frequency power system controller 225.

Figure 11:
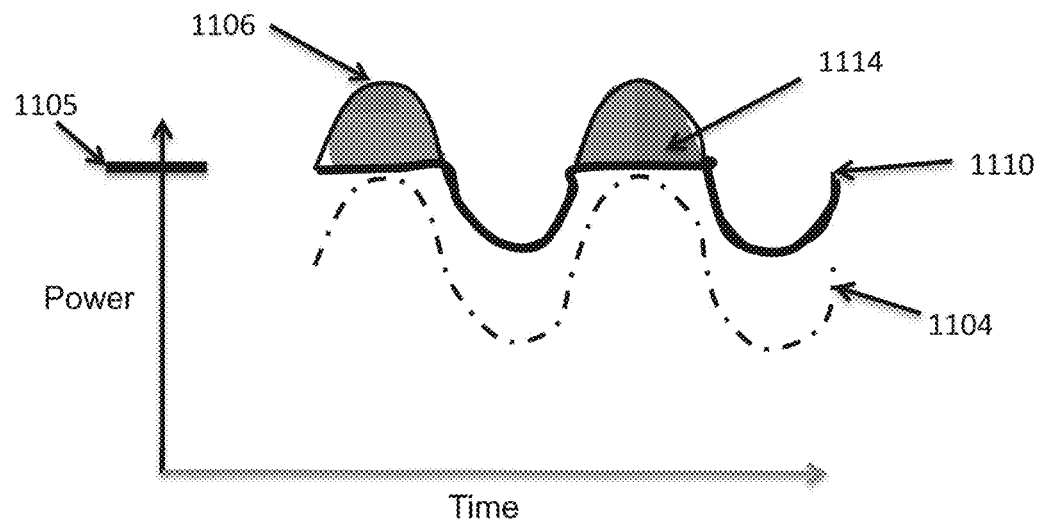
FIG. 11 illustrates a graph of an example use case of a power leveling system regarding operations near a power limit in accordance with an embodiment.

FIG. 11 is an example of a use case regarding icing conditions (or other cases where the aircraft is operating near an engine limit with varying power required) in accordance with an embodiment. As shown, the example graph 1101 of FIG. 11 illustrates a power 1104 normally required by the rotor system of the primary turbine system. The power 1104 varies with respect to time while cruising at a constant speed requires that the maximum power 1104 remain below the engine power limit 1105 (which may be limited by one or more engine or aircraft state parameters) to maintain cruise altitude and speed. If, however, the aircraft could augment its power to attain a power 1106 above the normally allowed power 1104, an increase in operating speed is attainable while still allowing for level flight at a constant speed. Thus, a quasi-steady state power 1110 is delivered by the primary turbine system and temporary power boosts (areas 1114) are delivered by the auxiliary power system to provide increased power to the rotor which allows an increased operating speed in icing as shown in FIG. 11.

Figure 12:
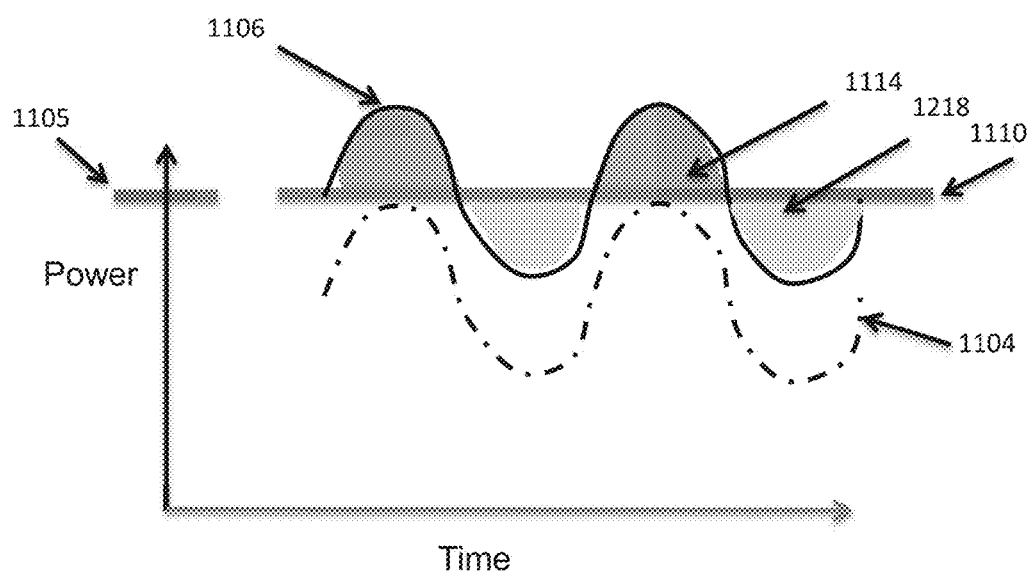
FIG. 12 illustrates another graph of an example use case of a power leveling system regarding operations near a power limit in accordance with an embodiment.

FIG. 12 is another embodiment illustrated via graph 1201 where temporary power loads 1218 are added and thus the quasi-steady state power 1110 approaches a more steady condition and more closely matches the engine power limit 1105. Alternately, in place of increased speed or operational capability near engine limits, high frequency power system controller 225 may be used to protect against engine or transmission limit blow-away events resulting from excessive rotor speed droop. Note that icing response can be a fairly low frequency (e.g., period of thirty seconds to five minutes), so the power leveling system 200 can be configured (e.g. via mode select signal 208) to define the threshold between "low" and "high" frequency to be appropriate for the particular use case. Additionally, the power leveling system can monitor the frequency of power 1106 and an auxiliary power system battery capacity (or small auxiliary propulsion system duty cycle) in order to determine the amplitude of power fluctuations the auxiliary power system can smooth out prior to saturation. Note that the power leveling system 200 can also provide advanced warning to a pilot to exit icing conditions or to change flight conditions if power fluctuations become too great.

Technical effects and benefits of embodiments of the power leveling system operating in variable power demand environments, as described above, include improved overall power delivery response rate, improved engine operations near engine limits, protection against blow-away events, improved engine efficiency, improved rotor NR management, and improved altitude and speed maintenance with autopilot engaged.

The present disclosure may be a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. In this way, the flowchart and block diagrams in the FIGS. illustrate the architecture, operability, and operation of possible implementations of systems, methods, and computer program products according to various embodiments of the present disclosure. Further, each block in the flowchart or block diagrams may represent a module, segment, or portion of instructions, which comprises one or more executable instructions for implementing the specified logical operation(s). In some alternative implementations, the operations noted in the block may occur out of the order noted in the FIGS. For example, two blocks shown in succession may, in fact, be executed substantially concurrently, or the blocks may sometimes be executed in the reverse order, depending upon the operability involved. It will also be noted that each block of the block diagrams and/or flowchart illustration, and combinations of blocks in the block diagrams and/or flowchart illustration, can be implemented by special purpose hardware-based systems that perform the specified operations or acts or carry out combinations of special purpose hardware and computer instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the operations/acts specified in the flowchart and/or block diagram block or blocks. These computer readable program instructions may also be stored in a computer readable storage medium that can direct a computer, a programmable data processing apparatus, and/or other devices to operate in a particular manner, such that the computer readable storage medium having instructions stored therein comprises an article of manufacture including instructions which implement aspects of the operation/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the operations/acts specified in the flowchart and/or block diagram block or blocks.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. A power leveling system comprising a high frequency controller, the power leveling system being configured to:
receive a power demand signal from one or more sensors, the power demand signal indicating a power requirement of a rotor system of the vehicle;
determine a high frequency component of the power demand signal;
determine a low frequency component of the power demand signal;
provide, via a low frequency controller of the power leveling system, a low bandwidth signal based on the low frequency component to a primary power system; and
provide, via the high frequency controller, a high bandwidth signal based on the high frequency component to an auxiliary power system, wherein a combination of primary power system and the auxiliary power system meets the power requirement of the rotor system.

2. The power leveling system of claim 1, wherein the power leveling system is configured to utilize the high bandwidth signal to cause the auxiliary power system to deliver an auxiliary power to the vehicle.

3. The power leveling system of claim 1, wherein the high bandwidth signal is based on a power deficiency between the power requirement of the vehicle and a power delivered by the primary power system.

4. The power leveling system of claim 1, wherein the power leveling system is configured to charge the auxiliary power system based on a power excess between the power requirement of the vehicle and a power delivered by the primary power system.

5. The power leveling controller of claim 1, wherein the power demand signal comprises at least one signal from one or more sensors, components, and systems in communication with the aircraft.

6. The power leveling system of claim 1, wherein the primary power system is a turbine engine system and the auxiliary power system is an electric power system.

7. The power leveling system of claim 1, wherein determining the low frequency component and the high frequency component of the power demand signal is in accordance with a mode select signal identifying an operational mode of the power leveling controller.

8. The power leveling system of claim 1, wherein the power leveling system is incorporated in an aircraft.

9. A method, comprising:
receiving, by a power leveling controller comprising a processor and a memory, a power demand signal from one or more sensors, the power demand signal indicating a power requirement of a rotor system of a vehicle;
determining, by the power leveling controller, a high frequency component of the power demand signal;
determining, by the power leveling controller, a low frequency component of the power demand signal;
providing, via a low frequency controller of the power leveling controller, a low bandwidth signal based on the low frequency component to a primary power system; and
providing, via a high frequency controller of the power leveling controller, a high bandwidth signal based on the high frequency component to an auxiliary power system, wherein a combination of the primary power system and the auxiliary power system to meet the power requirement of the rotor system.

10. The method of claim 9, wherein the providing of the high bandwidth signal and the low bandwidth signal, respectively, causes the auxiliary power system and the primary power system to operate in concert to meet the power requirement of the rotor system of the vehicle.

11. The method of claim 9, wherein the high bandwidth signal is based on a power deficiency between the power requirement of the vehicle and a power delivered by the primary power system.

12. The method of claim 9, performed by a power leveling controller incorporated in an aircraft.

\* \* \* \* \*